United States Patent
Gunasekara et al.

(10) Patent No.: US 8,160,564 B1
(45) Date of Patent: Apr. 17, 2012

(54) REMOTE CONTROL OF COMPUTING DEVICE APPLICATIONS USING MOBILE DEVICE

(75) Inventors: Don Gunasekara, Reston, VA (US); Tom Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 981 days.

(21) Appl. No.: 12/136,587

(22) Filed: Jun. 10, 2008

(51) Int. Cl.
*H04M 3/00* (2006.01)
(52) U.S. Cl. ............ 455/419; 455/420; 455/556.1; 709/223
(58) Field of Classification Search .......... 455/452.1, 455/456.1, 420
See application file for complete search history.

(56) References Cited

U.S. PATENT DOCUMENTS

| | | | |
|---|---|---|---|
| 2006/0161865 A1* | 7/2006 | Scott et al. | 715/810 |
| 2006/0218191 A1* | 9/2006 | Gopalakrishnan | 707/104.1 |
| 2008/0273755 A1* | 11/2008 | Hildreth | 382/103 |

* cited by examiner

*Primary Examiner* — Wayne Cai
*Assistant Examiner* — Chuck Huynh

(57) ABSTRACT

Embodiments described herein are directed to controlling an application on a computing device with a mobile device. The mobile device captures an image of the application (i.e., by taking a photograph of the computing device's screen). A request is made to the computing device for bitmap information and the available options of the application. Once received by the mobile device, the options are associated with the bitmap representation and hard and/or soft keys are assigned on the mobile device. The user can then view the image of the application and select any of the keys, which, in turn, initiates requests for action that are submitted to the computing device. The computing device associates the actions with the corresponding options in the application and processes the actions accordingly.

20 Claims, 6 Drawing Sheets

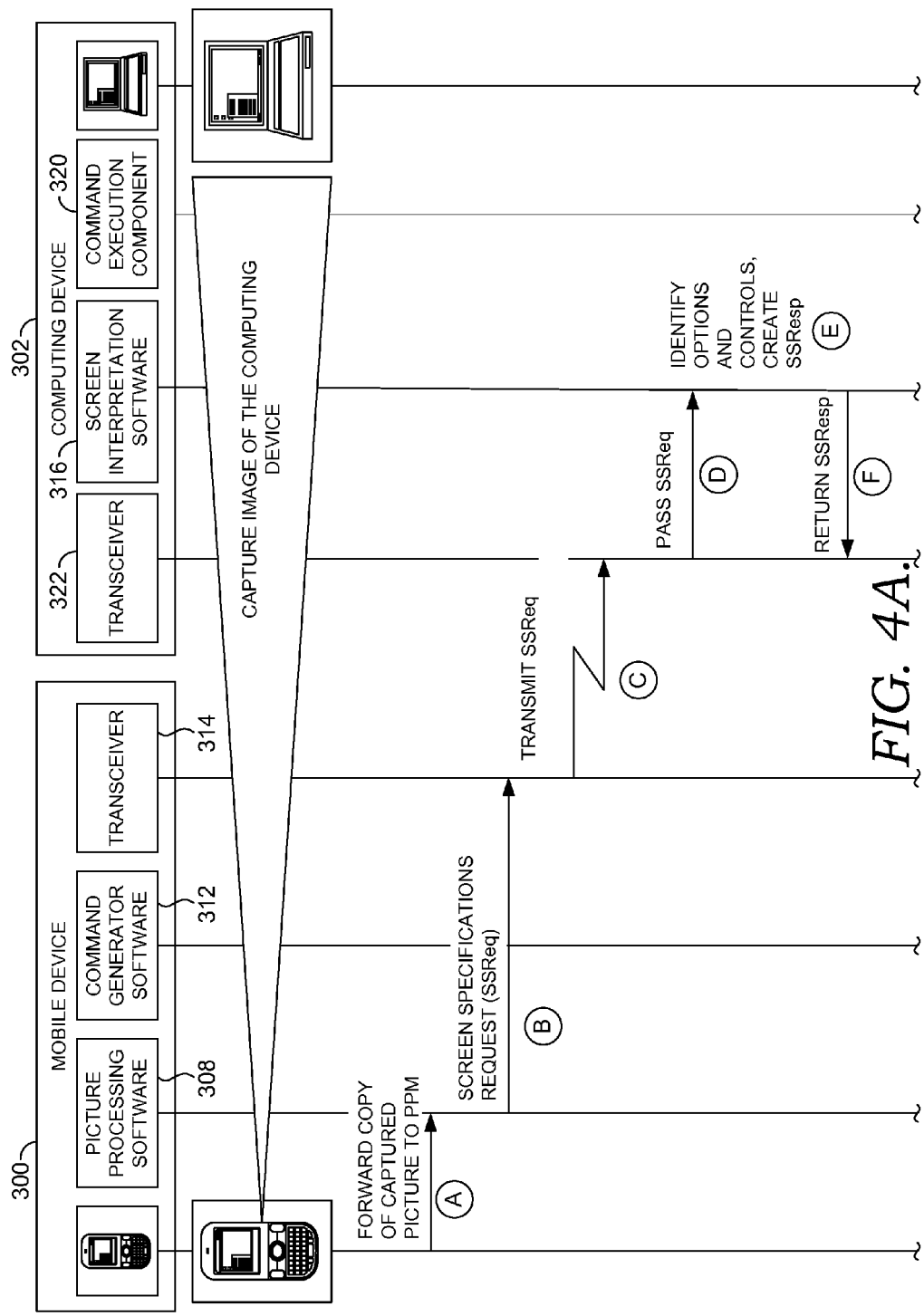

REMOTE CONTROL OF COMPUTING DEVICE APPLICATIONS USING MOBILE DEVICE

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to capturing, on a mobile device, an image of an application executing on a computing device and enabling the mobile device to remotely issue commands to interact with the application on the computing device. The mobile device captures the image with a camera. Specification information about the application is requested from the computing device. The computing device provides a bitmap representation of the application along with one or more user-manipulative options related to the bitmap representation. In alternative embodiments, a JPEG or TIFF may be presented in lieu of the bitmap representation and in conjunction with the user-manipulative options. The mobile device associates the user-manipulative options with portions of the image corresponding to the various options. Keys can then be assigned to provide functionality to the user for using the options.

The mobile device includes picture processing software configured to request the specification information associated with the application and map the specification information to the captured image. The picture processing software also associates the options associated with the application to a portion of the image and assigns the keys so the user can remotely manipulate the application. Moreover, the mobile device also includes command generator software to translate user selections of the keys into actions associated with the application. These actions are transmitted to the computing device for processing.

In another aspect of the invention, a user's input on the mobile device is translated to fit the screen of the computing device. To do so, a screen size or bitmap representation of the user computing device's screen is used to convert the user's input for processing on the computing device.

BRIEF DESCRIPTION OF THE SEVERAL VIEWS OF THE DRAWINGS

The present invention is described in detail below with reference to the attached drawing figures, wherein:

FIGS. 4A-4B are diagrams of various steps associated with a mobile device capturing an image on a computing device and creating options on the mobile device that can be used to interact with options on the computing device in accordance with an embodiment of the invention.

DETAILED DESCRIPTION

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Further, various technical terms are used throughout this description. A definition of such terms can be found in *Newton's Telecom Dictionary* by H. Newton, 23rd Edition (2007). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product that is embodied on one or more tangible computer-readable media. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media. Computer-readable media include both volatile and nonvolatile media as well as removable and nonremovable media.

By way of example, and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Figure 2A:
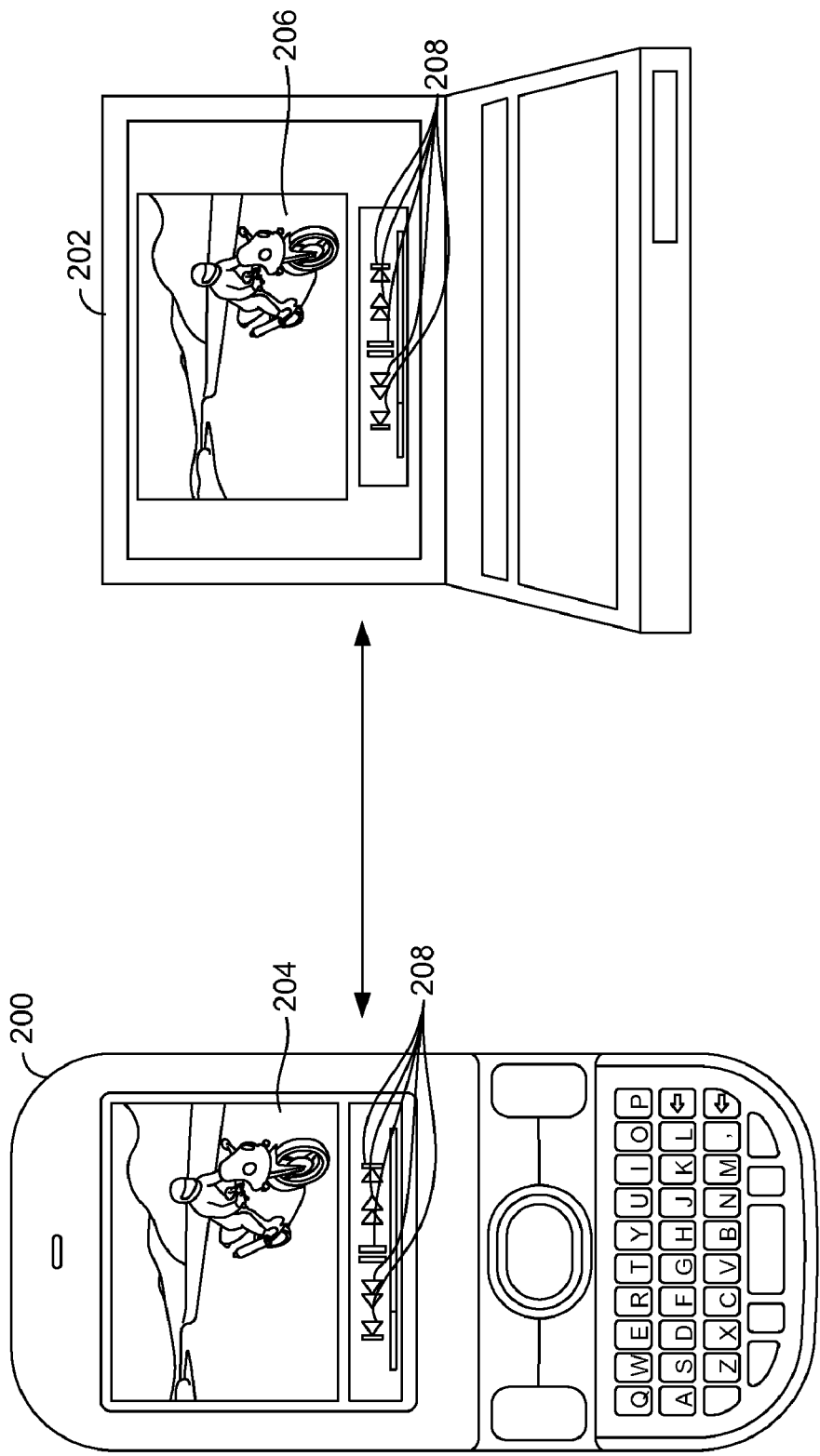
FIGS. 2A-2B are diagrams illustrating mobile devices communicating with a computing device in accordance with an embodiment of the invention.

The invention can generally be described as systems for, methods to, and computer-storage media storing instructions for allowing a mobile device to capture an image on the screen of a computing device, interpret the options within the image, and create renditions of the options on the mobile device so that a user can interact with the options on the mobile device. For example, as illustrated in FIG. 2A and discussed in more detail below, a user can take a picture of a displayed media player on a computing device using a mobile phone. Various options may be pictured in the image—for example, "play," "fast forward," "rewind," "zoom," etc. Once an image is captured, the mobile device identifies the options in the image and presents renditions of the options on the mobile device. When a user interacts with the rendition of the options, the mobile device can communicate commands to the computing device accordingly. This allows a user to use his or her mobile device as somewhat of a remote option for applications on the computing device.

In one embodiment, the mobile device identifies options by examining the captured image and comparing portions thereof with known images of options previously stored on the mobile device. For example, a single triangle pointing to the right may indicate "play" or two triangles to the right may indicate "fast forward." Various graphics and/or text may also be used to identify options, such as an open folder to signify opening a file or text such as "File," "Edit," or the like to identify menus. Other logos, text, or objects are also possible and will be evident to one of skill in the art.

In another embodiment, the mobile device does not associate options with the captured image. Rather, the mobile device receives inputs from the user and passes the inputs to the computing device. The images are translated (either on the mobile device before transmission or on the computing device afterward) from the screen of the mobile device t the screen of the computing device. For example, a user maneuvering a mouse two inches from the top of a four-inch screen on the mobile device may be translated to a mouse movement seven inches from the top of a fourteen-inch screen on the computing device. Translation between screens may be effectuated using screen size information or bitmap representations from the computing device.

Figure 1:
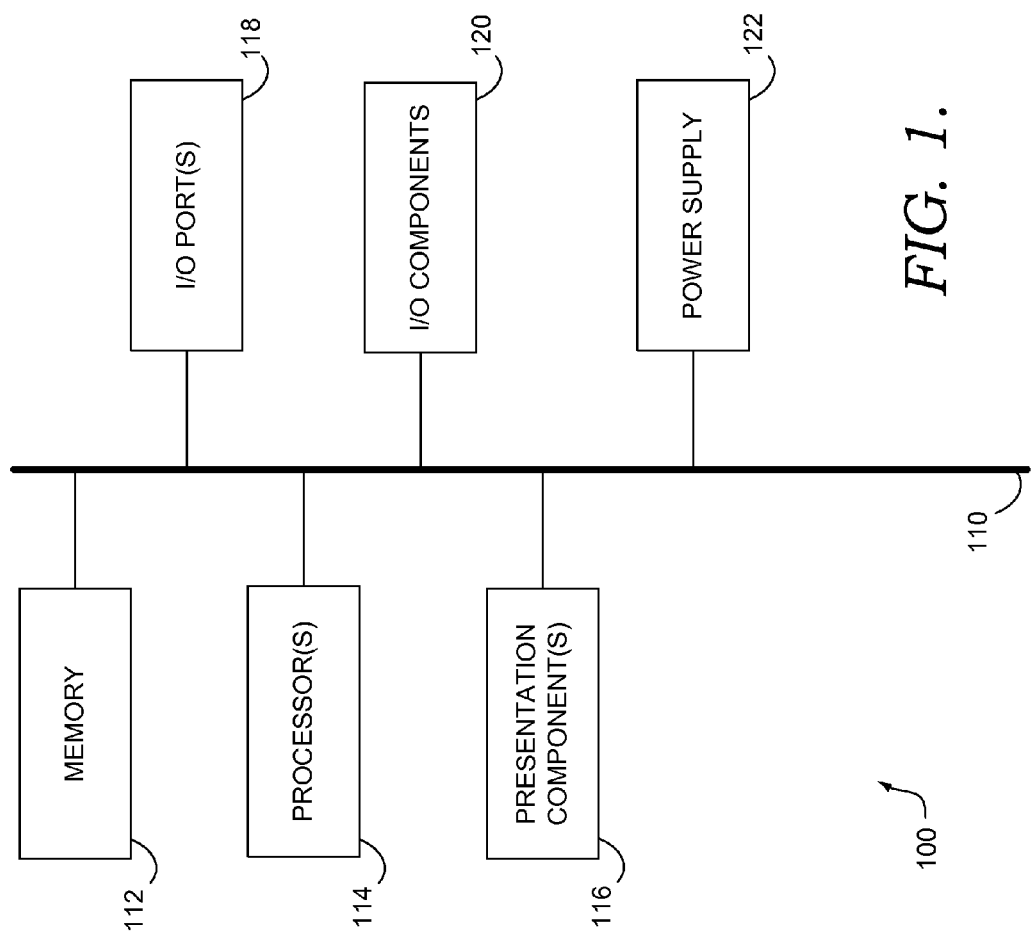
FIG. 1 is a block diagram of an exemplary operating environment for use in implementing an embodiment of the present invention.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

The components described above in relation to computing device 100 may also be included in a mobile device. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

FIG. 2A is a diagram illustrating a mobile device 200 communicating with a computing device 202 in accordance with an embodiment of the invention. This figure shows an image 204 and an application 206 (in this instance a media viewer) that was captured by the mobile device 200. The application 206 is being executed and rendered by the computing device 202. The application 204 includes a number of options 208 indicated by various icons—e.g., double arrow right for fast forward, double arrow left for rewind, line and arrow right for slow motion forward, etc. A user in front of the computing device 202 could interact with the options 208 using various input/output interfaces, such as a mouse, keyboard, or the like. Embodiments of the present invention, however, allow the user to indirectly interact with the options 208 by selecting options 208 on the mobile device 200.

Once a user selects an option 208, the mobile device 200 communicates the selected option 208 (e.g., fast forward) to the computing device 202 for processing. The selected option 208 may be sent to the communication device using low-powered RF signals (e.g., Bluetooth), free-space optical communication (e.g., infrared (IR) signals), Near Field Communications (NFC), or other methods well known to those ordinarily skilled in the art. Such communication methods may create a personal area network (PAN) in which the mobile device 200 can communicate with the computing device 202. For example, a user with a Bluetooth-enabled phone may communicate with the computing device 202 as long as the user is within 10-15 meters of the computing device 202.

Various communications protocols may also be used to communicate options to the computing device 202. For example, IR communications may be sent using an IR data association (IrDA) protocol specification. Examples of IrDA protocol specifications include, without limitation, Infrared Physical Layer Specification (IrPHY), Infrared Link Access Protocol (IrLAP), Infrared Link Management Protocol (IrLMP), Tiny Transport Protocol (Tiny TP), Infrared Communications Protocol (IrCOMM), Infrared Object Exchange (IrOBEX), Infrared LAN (IrLAN), or the like. One skilled in the art will appreciate that various other specifications or protocols may be used.

Alternatively, the selected option 208 may be communicated to the computing device 202 through a networked environment, such as the Internet, a land area network (LAN), wide area network (WAN), Wireless LAN (WLAN), RF network, wireless network, or combination thereof. The RF network may separate spectrums for access by employing code division multiple access (CDMA), time division multiple access (TDMA), or the like. Similarly, the network may in fact be an integrated digital enhanced network (iDEN). The mobile device 200 and the computing device 202 may be enabled to communicate across such networks. Furthermore, one skilled in the art will appreciate that various protocols be used with such networks. For example, the hypertext transfer protocol (HTTP), Internet protocol suite (TCP/IP), or the like. Also, various wireless standards may be used as well, such as WiFi, WiMAX, or the like.

Figure 2B:
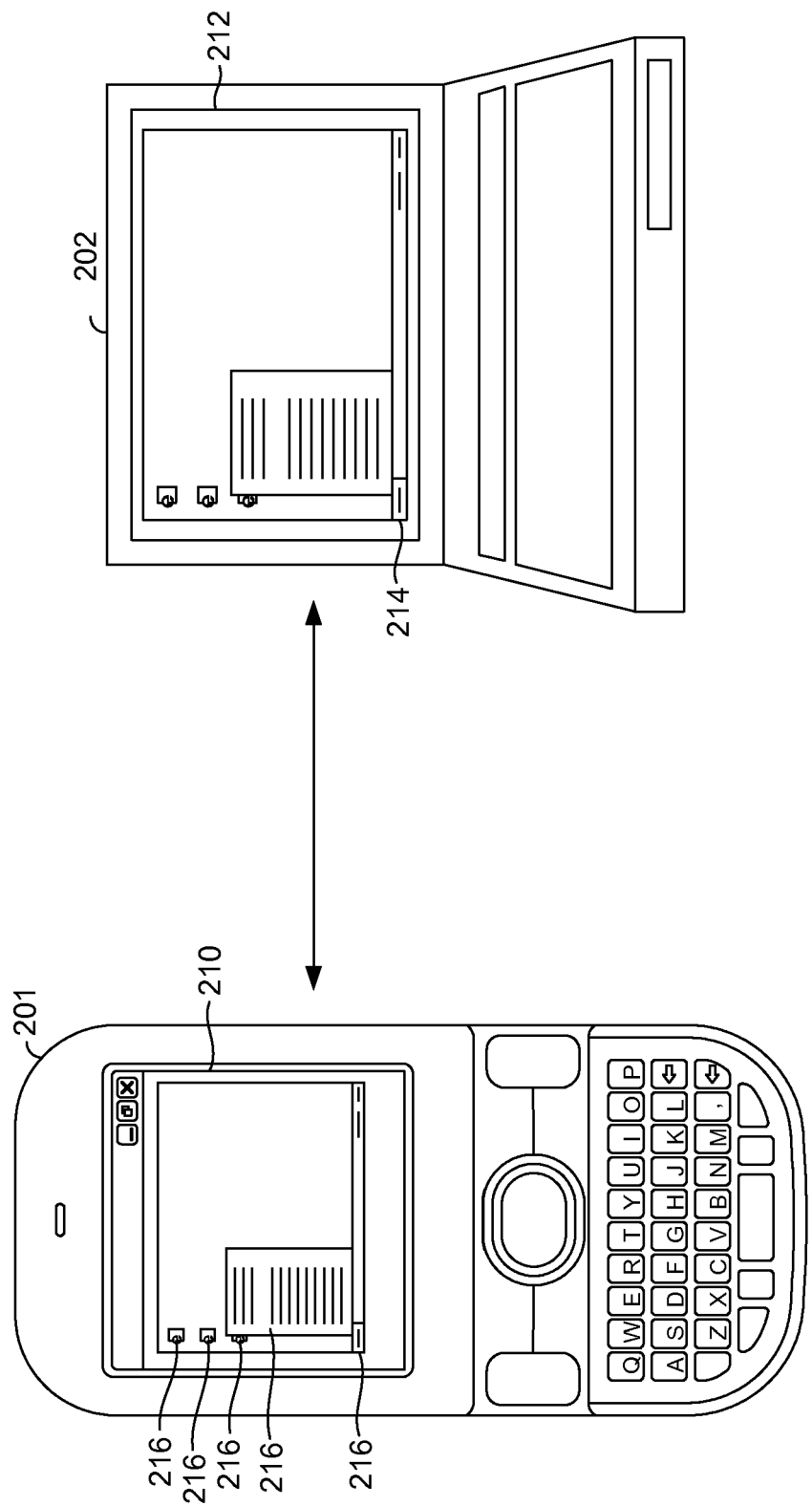

The mobile device 200 may capture an image of nearly any type of application on the computing device 202. Embodiments described herein generally apply in the same manner regardless of the type of application captured. FIG. 2B illustrates a mobile device 201 after having captured an image 210 of a GUI display 212 from the computing device 204. The captured GUI display 212 illustrates a GUI of an operating system (OS) on the computing device 212. The OS may have a plethora of options a user could interact with, such as initiating an application by selecting an icon, pulling up a START menu (e.g., in a version of Microsoft Windows® developed by the Microsoft Corporation®), dragging a line of text or an application to a recycle bin, etc. Numerous other options are also possible.

The mobile device 201 in FIG. 2B is configured to identify the options 214 within the image 210 captured by a camera of the mobile device 201. In one embodiment, the mobile device 201 presents the image 210 of the GUI display, identifies options (marked in FIG. 2B as identified options 216) within the image 210, and configures keys on the mobile device 201 allowing the user to interact with the identified options 216. For example, a key may be set for pressing "Play," left or right clicking a mouse, moving a mouse cursor, opening an application, other similar actions.

Keys may be either hard keys, soft keys, or a combination thereof. A hard key is any physical button, wheel, ball, or scrolling device that may be pressed or manipulated by the user. For example, an option to fast forward a video may be assigned to the "Send" button on the mobile device 201. Or, in another example, a volume option may be assigned to the volume buttons on the mobile device 201.

Soft keys, as described herein, refer to either unmarked buttons or touch-screen buttons that change based on whatever application is currently active on the mobile device 201. In one embodiment, the assigned soft key's functionality is illustrated on the screen either by color, text, or graphic. For example, a touch-screen mobile phone may present a button that is green or contains an arrow pointing to the right on the touch-screen interface in order to designate a "play" option. Additionally, the soft key may be represented on the screen and assigned to a hard key (e.g., an actual button or scroll wheel). For example, an option to fast forward may be illustrated directly above an unmarked button by the letters "FF." Moreover, soft keys may also represent various input devices that can be used in the GUI on a touch-screen display—for example, a mouse, keyboard representation, microphone display, or other device. One skilled in the art will appreciate that other soft keys may also be incorporated into various embodiments described herein.

Figure 3:
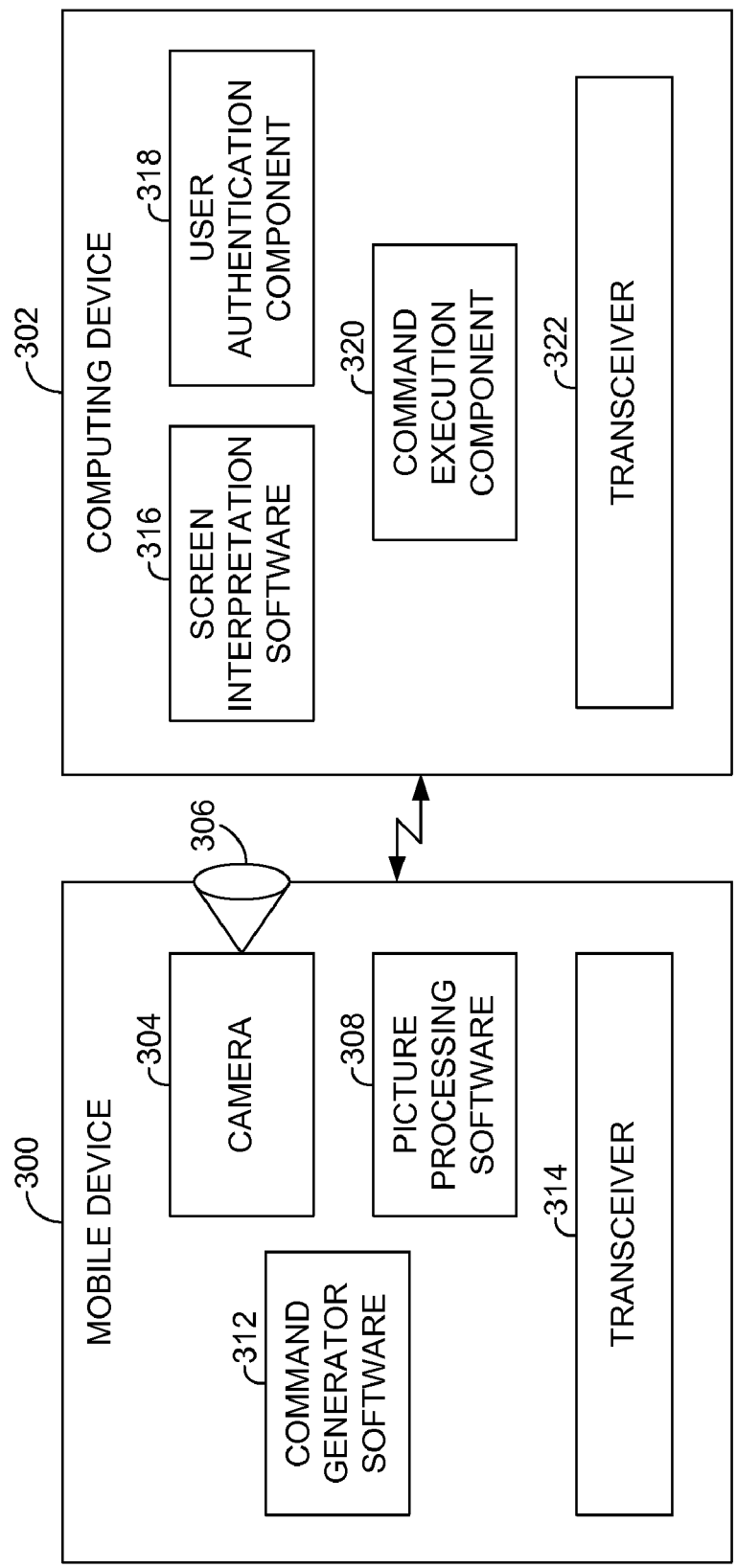
FIG. 3 is a block diagram illustrating a mobile device communicating with a computing device in accordance with an embodiment of the invention.

FIG. 3 is a block diagram illustrating a mobile device 300 in communication with a computing device 302 in accordance with an embodiment of the invention. In addition to the electronic components described above with respect to computing device 100, the mobile device 300 and the computing device 302 contain supplementary hardware and software illustrated in FIG. 3. Specifically, the mobile device 300 includes camera 304, lens 306, picture processing software 308, command generator software 312, and transceiver 314. Moreover, the computing device 300 includes the following in addition to the aforesaid components in computing device 100: screen interpretation software 316, user authentication component 318, command execution software 320, and transceiver 322. FIG. 3 illustrates an exemplary embodiment and is provided solely for explanatory purposes, not for limiting embodiments of the present invention to any particular software and hardware. In actuality, some embodiments may include additional hardware and/or software not illustrated in FIG. 3, and others may not include all of the illustrated hardware and/or software.

The software illustrated in FIG. 3 and referenced herein may be implemented programmatically using any number of source-code programming languages (e.g., C, C++, C#, Java, etc.), assembly language, shader language, application programming interfaces (APIs), or the like. Shader languages may be processed, in some embodiments, in parallel threads by a graphical programming unit (GPU).

The mobile device 300 communicates with the computing device 302 via transceivers 314 and 322. The transceivers 314 and 322 may communicate using any of the previously described networks (e.g., Internet, LAN, WAN, WLAN, RF). Or, in some embodiments, transceivers 314 and 322 communicate using low-powered RF signals (e.g., via Bluetooth), IR signals, NFC, or the like.

For Bluetooth communication, the transceivers 314 and 322 may transmit data via low-power radio waves with specific frequencies (e.g., between 2.40 GHz and 2.480 GHz). Operationally, the transceivers 314 and 322, when operating as Bluetooth transceivers, communicate information using a Bluetooth protocol. Bluetooth protocols may include, for example but without limitation, Bluetooth version 1.0, 1.1, or 2.0. As one skilled in the art will understand, a Bluetooth-enabled device creates wireless personal area networks (PANs), or "piconets." Once another Bluetooth-enabled device enters the PAN, the two can communicate. For example, the mobile device 300 may be able to communicate with the computing device 302 when the mobile device 300 enters the PAN of the computing device 302.

Camera 304 captures still images or videos through lens 306. In operation, a user points the camera 304 toward the display of the computing device 302 and snaps a photograph or records a video of the display. In alternative embodiments, images or videos may be downloaded from a network (e.g., the Internet) and stored on the mobile device 300. Digital cameras are generally well known and need not be discussed at length herein. For the sake of clarity, embodiments for capturing and processing images are only described, even though videos may easily be captured by the camera 304 and processed by software described below.

Picture processing software 308 receives the image captured by the camera 304 and logically maps the image to the screen of the mobile device 300. Once captured and processed, the picture processing software 308, in one embodiment, initiates a request for the screen specifications (SSReq), which is transmitted to the computing device 302 (via transceivers 314 and 322). The computing device 302, upon receipt of the SSReq, sends the request to the command execution component 320, which uses an API in one embodiment to interpret the request into a form that can be processed by computing device 302. The computing device 302 retrieves the requested specification information and returns the requested specification information to the mobile device 300.

The SSReq may request a slew of information from the computing device 302, and the computing device 302 may respond with a response (SSResp) containing the requested information. Examples of the information that may be requested by the SSReq and included in an SSResp include, without limitation, information associated with bitmap representations of applications on the computing device 302, frame sizes of the computing device 302 or an application on the computing device 302, ASCII values for keys on the computing device 302, options for applications on the computing device 302, media capabilities of applications on the computing device 302, a user agent profile (UAProf), headers of an X-WAP-PROFILE communication, X.19 certificates, or the like. Media capabilities, as referred to herein, the multimedia supported by an application on the computing device. For example, the SSResp may specify that the application supports particular types of multimedia (e.g., audio, video, image), multimedia application (e.g., Windows Media Player®, iTunes®, etc.), file formats (e.g., MP3, MP4, JPEG, TIFF, PICT, WMP, etc.), or other information identifying the capabilities of the computing device 302.

Instead of using options returned by the computing device 302, the mobile device 300, in one embodiment, maps the application on the computing device 302 to the image captured by the mobile device 300 using the frame size or the bitmap representation returned in the SSResp. In this embodiment, the mobile device 302 receives an SSResp with either the frame size or the bitmap representation of the computing device 302. The mobile device 300 then associates the received frame size or bitmap representation with an image of the screen of computing device 302. This association results in an translational representation of the screen displayed on the computing device 302 with the captured image of that screen. An user can interact with the image on the mobile device 302 using various keys, and the user interactions can then be sent to the computing device 302, and the user's input on the mobile device 300 can be translated to the equivalent position of such an input on the computing device 302. This translation may be performed by the mobile device 300 before indications of the user's input are sent or on the computing device 302 along with representations of the user's input.

One skilled in the art will appreciate that a UAProf may refer to an extensible markup language (XML) document that contains information about the features and capabilities of the computing device 302. The XML document of the UAProf may be found in an X-WAP-PROFILE header, a profile header, or an HTTP header. An exemplary X-WAP-PROFILE header for the Nokia 6230i mobile device may look like: http://nds1.nds.nokia.com/uaprof/N6230ir200.xml. An exemplary X-WAP-PROFILE header for the Nokia 6230 mobile device may look like:http://nds1.nds.nokia.com/uaprof/N6230r200.xml. Other examples are also possible.

In one embodiment, specification information is returned in an SSResp and designates the options of a particular application in addition to the screen or bitmap representation associated with each option. In one embodiment, the bitmap or screen size for each option is retrieved from a video card onboard the computing device 302. Furthermore, the response (SSResp) from the computing device 302 also contains instructions for the performance of each option. For example, the SSResp would contain the ASCII value assigned to a particular option upon its activation. Or the SSResp would include the initiation of software (e.g., which subroutine to call and parameters to pass) within an application on the computing device 302 for the selection of a "Play" button. In another example, the SSResp could also identify other web services (e.g., an online map service or stock ticker) or other applications operating on remote computing devices as well as the software calls for accessing such web services or applications.

It should be noted, however, that options may not be communicated by the computing device 302 or used by the mobile device 300 in some embodiments. In these embodiments, as previously discussed, only screen size or bitmap parameters may be communicated to and may be used by the mobile device 300 to map a captured image on the mobile device 300 to the screen of the computing device 302. When a user interacts with the captured image on the mobile device 300 (e.g., using various keys), the user inputs may be passed to the computing device 302 for execution. Before or after transmission, user inputs may be translated, based on the screen size or bitmap representation, to the appropriate screen size of the computing device 302. For example, a user's mouse click on a four-inch screen of the mobile device 300 can be translated to a corresponding spatial location on a fifteen-inch screen of the computing device 302. The computing device 302 may then apply the translated user input to an application accordingly. Thus, in this embodiment, the computing device 302 maintains options for executing software and simply executes translated user inputs from the mobile device 300.

The command generator software 312 receives the SSResp, stores the contents of the SSResp, and parses options, commands, bitmaps, screen sizes, or other information in the SSResp. An API to translate the commands into a format that can be understood by the command generator software 312. Further, the command generator software 312, in one embodiment, assigns keys (hard, soft, or both) on the mobile device 300 to the identified options. The keys may be presented to the user (e.g., soft keys), or key functionality may be switched (e.g., changing a track ball to move a mouse cursor).

In alternative embodiments, the command generator software 312 does not assign keys to options; rather, the command generator software 312 translates user inputs into the inputs' spatial equivalents on the screen of the computing device 302. For example, the command generator software 312 may translate the spatial position where a user initiates a mouse left-click on a four-inch screen of the mobile device 300 into the equivalent spatial position on a twenty-inch screen of the computing device 302. In yet another embodiment, such a translation is performed on the computing device 302, not by the command generator software 312.

In one embodiment, the command generator software 312 creates a bitmap of the image on the mobile device 300. This created bitmap identifies, among other things, the location of each option in the captured image. Then, the options specified in the SSResp can be translated (if needed) by the API of the mobile device 300 and assigned to various portions within the created bitmap in which the SSResp identifies options.

The SSResp is created by the picture processing software 308 on the computing device 302. The screen interpretation software 316 receives the SSReq and identifies the application running (or in focus) on the computing device 302. To identify the running application, the SSReq may include requests for the time the image was captured, and the screen interpretation software 316 may compare a log file to identify the application. Also, the SSReq may additionally request the frame size of the computing device 302, software executing on the computing device 302, software bitmap representations, character set support information (e.g., ASCII values, input/output device commands, etc.), media capabilities (e.g., types of supported multimedia, multimedia software, multimedia device, or file formats), supported communication protocols (e.g., SOAP, HTTPS, FTP, ActiveSync, etc.), UAProf, X-WAP-PROFILE header information, X.19 certificate information, or the like. One skilled in the art will appreciate that the above list is not exhaustive, as additional information may also be requested in an SSReq and returned in and SSResp.

After the keys have been assigned, the user, in one embodiment, can use the mobile device 300 as a remote control for interacting with the application pictured in the image. Commands initiated by the user are transmitted to the mobile device 300 and for processing by the command execution component 320. The command execution component 320 may include software and/or hardware to effectuate commands by the user. For example, the command execution component 320 may trigger, though a driver, speakers on the computing device 302. Taking another example, the command execution component 320 may initiate a software application that records audio and stores an audio file sent from the mobile device 300. Various other options are also possible.

Some applications on the computing device 302 may require users to authenticate themselves before enabling access. The user authentication component 318 handles authentication and regulates access to the private applications. The user authentication component 318 may employ various cryptographic methods, such as a public key infrastruction (PKI), public/private key pairs, digital rights management (DRM), X.509 certificates, tokens, cookies, or other well-known techniques. In one embodiment, the user authentication component 318 verifies a username and/or password. In another embodiment, the user authentication component 318 interacts with the telecommunications provider to ascertain the location of the user before granting access—which may be particularly helpful for applications requiring a user to be within a particular building or room. Other authentication requirements are also possible and will be well known to those of skill in the art.

Figure 4B:
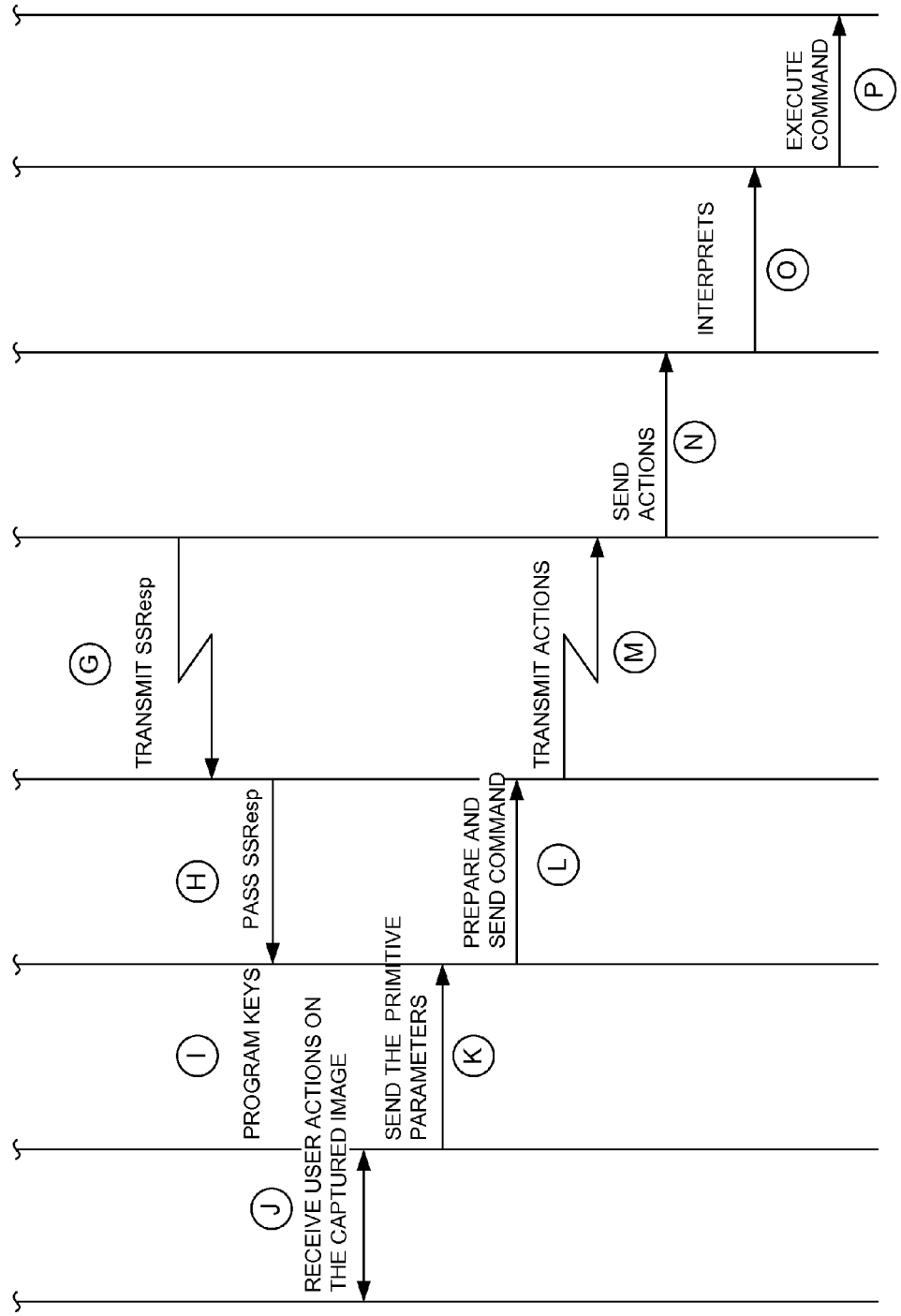

FIGS. 4A-4B are diagrams of various steps associated with the mobile device 300 capturing an image on a computing device 302 and creating options on the mobile device 300 that can be used to interact with options on the computing device 302 in accordance with an embodiment of the invention. FIGS. 4A-4B represent a single timeline that has been broken up into multiple figures for the sake of clarity. The timeline presented in FIGS. 4A-4B is merely provided for explanatory purposes and only represents one embodiment; therefore, other embodiments should not be limited to any particular sequence of steps presented in these figures.

As illustrated in FIG. 4A, the mobile device 300 captures an image of the screen of the computing device 302, as indicated at step A. A copy of the image is forwarded to the picture processing software 308, which stores the image and submits an SSReq to the transceiver 314 (step B), which transmits the SSReq to the transceiver 322 of the computing device 302 (step C). Once received, the SSReq is passed to the screen interpretation software 316, which identifies the options and controls of the application in the image, indicated at step E. The options may include, for example, ASCII representations, input/output device commands (e.g., a mouse left or right click), executable software or the like—all of which may be incorporated into an SSResp.

The SSResp is returned sent to transceiver 322 (step F), which transmits the SSResp to transceiver 314 (step G in FIG. 4B). The mobile device 300 passes the SSResp to the command generator software 312, indicated at H, which parses the SSResp (i.e., applies an API) to uncover the returned bitmap, options, and controls (i.e., their primitive parameters). Keys on the mobile device 300 are assigned based on the various actions the user can take, as indicated at I. For example, a hard key with an upward arrow that is typically reserved for increasing volume on the mobile device 300 may be reassigned to function as a fast forward feature for a media player in the image. Other key configurations are also possible.

The user can interact with the image through using the assigned keys. User actions (hard or soft key press) are passed to the picture processing software 308, as indicated at step J. In one embodiment, the picture processing software 308 abstracts the user's actions into their primitive parameters, indicated at K. For example, a user pressing a soft key for a particular letter may be translated into a specific ASCII value, or a mouse left-click on the mobile device 300 may be translated for the screen of the computing device 302. In one embodiment, the command generator software 312 creates a an action request (indicated at L) using an API to translate the primitives into actions understandable by the computing device 300. In another embodiment, the primitives are sent to and translated by an API on the computing device 302. Or, in another embodiment, user inputs are translated (either by the mobile device or the computing device) for equivalent representation between differently sized screens of the mobile and computing devices.

The actions, whether translated or not, are transmitted to the transceiver 322, as indicated at M, and passed to the screen interpretation software 316, as indicated at N. The screen interpretation software 316 interprets the actions and associates them with commands for the application, as indicated at O. Then, the associated commands are executed by the computing device 302, as indicated at P.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. One or more non-transitory computer-readable media having computer-executable instructions embodied thereon for capturing, on a mobile device, an image of an application executing on a computing device and enabling the mobile device to remotely issue commands to interact with the application on the computing device, the method comprising:
   receiving an image of the application executing on the computing device, separate from the mobile device, by capturing the image of the application executing on the computing device with a digital camera in the mobile device;
   requesting, from the computing device, specification information associated with the application, wherein the specification information includes:
      requesting a data representation of the application within the image, wherein the data representation is a bitmap representation, a JPEG representation, or a TIFF representation; and
      requesting identification of one or more user-manipulative options related to the bitmap representation, wherein the one or more user-manipulative options enable a user to interact with the application;
   receiving the bitmap representation and the one or more user-manipulative options;
   associating the user-manipulative options with one or more portions of the image; and
   assigning at least one key on the mobile device to a user experience corresponding to at least one of the one or more user-manipulative options.

2. The media of claim 1, further comprising:
   receiving an action from the user; and
   converting the action into one or more primitive parameters.

3. The media of claim 2, further comprising:
   preparing a request for the action, wherein the request includes the one or more primitives;
   applying an application program interface to convert the request into a second request that is understood by the computing device; and
   wirelessly transmitting the second request to the computing device for processing.

4. The media of claim 3, wherein the computing device associates a portion of the second request with at least one of the user-manipulative options.

5. The media of claim 4, further comprising the computing device manipulating the application based on the at least one of the user-manipulative options.

6. The media of claim 4, wherein the action from the user was indicated by the user within a second portion of the image that corresponds to an actionable portion of the application.

7. The media of claim 1, wherein the image is captured by a digital camera in a mobile phone.

8. The media of claim 1, further comprising transmitting the identification to the computing device via a wireless connection.

9. The media of claim 8, wherein the wireless connection comprises at least one of a low-powered RF, free-space optical communication, or Near Field Communications (NFC) connection.

10. The media of claim 1, wherein the one or more user-manipulative options comprise at least one of entry of text, manipulation of a mouse, fast forward, play, reverse, or access to one or more web services.

11. The media of claim 1, further comprising authenticating the user to the computing device.

12. The media of claim 11, wherein authenticating the user to the computing device includes submitting one or more keys.

13. The media of claim 11, wherein authenticating the user to the computing device includes adhering to a digital rights management (DRM) policy.

14. A mobile device configured to capture an image of an application executing on a computing device and enable a user to remotely control the application, comprising: picture processing software configured to:
   (1) wirelessly transmit a request to the computing device for specification information associated with the application,
   (2) map the specification information to the image of the application executing on the computing device that was captured by a digital camera of the mobile device, where the computing device is separate from the mobile device,
   (3) identify one or more options associated with the application, from the specification information, and
   (4) assign at least one key to the one or more options;
   command generator software configured to translate a user's selection of the key into one or more actions associated with the application; and
   a transceiver to communicate the one or more actions to the computing device for processing.

15. The mobile device of claim 14, wherein the specification information includes a bitmap representation of the application.

16. The mobile device of claim 15, wherein the specification information includes information associating the one or more options to the bitmap.

17. The mobile device of claim 14, wherein a portion of the application associated with the action corresponds to a portion of the image displaying the application.

18. One or more non-transitory computer-readable media having computer-executable instructions embodied thereon for capturing, on a mobile device, an image of an application executing on a computing device and enabling the mobile device to remotely issue commands to interact with the application on the computing device, the method comprising:
   storing the image of the application executing on the computing device that was captured by a digital camera of the mobile device, wherein the computing device is separate from the mobile device;
   wirelessly transmitting a request to the computing device for specification information associated with the application;
   assigning at least one key to a representative option illustrated in the image;
   receiving input from a user;
   translating the input from the screen of the mobile device to the screen of the computing device using an indication of at least one of a screen size or a bitmap associated with the computing device; and
   transmitting a translation of the input corresponding to the screen of the computing device, wherein the translation is based on the indication of the least one of the screen size or the bitmap associated with the computing device, such that the computing device can process the input as if it was entered on the computing device.

19. The mobile device of claim 18, further comprising:
   translating a user's selection of the key into one or more actions associated with the application; and
   communicating the one or more actions to the computing device for processing.

20. The mobile device of claim 18, wherein the specification information comprises a bitmap representation of the application.

* * * * *